US012662964B2

(12) United States Patent
Kannan et al.

(10) Patent No.: US 12,662,964 B2
(45) Date of Patent: Jun. 23, 2026

(54) FUEL NOZZLE FOR AN AIRCRAFT ENGINE

(71) Applicant: Pratt & Whitney Canada Corp.,
Longueuil (CA)

(72) Inventors: Jayaprakash Kannan, North York
(CA); Aleksandar Kojovic, Oakville
(CA)

(73) Assignee: Pratt & Whitney Canada Corp.,
Longueuil (CA)

( * ) Notice: Subject to any disclaimer, the term of this
patent is extended or adjusted under 35
U.S.C. 154(b) by 148 days.

(21) Appl. No.: 18/368,366

(22) Filed: Sep. 14, 2023

(65) Prior Publication Data

US 2025/0092827 A1 Mar. 20, 2025

(51) Int. Cl.
*F23R 3/28* (2006.01)
*F02C 7/22* (2006.01)
(52) U.S. Cl.
CPC . *F02C 7/22* (2013.01); *F23R 3/28* (2013.01)
(58) Field of Classification Search
CPC ..................................... F23R 3/28; F02C 7/22
See application file for complete search history.

(56) References Cited

U.S. PATENT DOCUMENTS

| | | | |
|---|---|---|---|
| 5,303,554 A | 4/1994 | Faulkner | |
| 5,579,645 A * | 12/1996 | Prociw | F23R 3/54 |
| | | | 239/404 |
| 6,289,676 B1 | 9/2001 | Prociw | |
| 6,547,163 B1 | 4/2003 | Mansour | |
| 8,096,129 B2 | 1/2012 | Francis | |
| 11,149,950 B2 | 10/2021 | Niemeyer | |
| 11,326,775 B2 | 5/2022 | Kramer | |
| 11,767,978 B2 | 9/2023 | Morgan | |
| 11,919,028 B2 | 3/2024 | Thomson | |

(Continued)

FOREIGN PATENT DOCUMENTS

| | | |
|---|---|---|
| EP | 0924460 B1 | 4/2003 |
| EP | 1793165 A2 | 6/2007 |

(Continued)

OTHER PUBLICATIONS

EP Search Report for EP Patent Application No. 24200374.7 dated
Dec. 11, 2024.

*Primary Examiner* — Gerald L Sung
(74) *Attorney, Agent, or Firm* — Getz Balich LLC

(57) ABSTRACT

A fuel nozzle for a gas turbine engine includes a first fuel
nozzle body and a second fuel nozzle body. The first fuel
nozzle body and the second fuel nozzle body form a fuel
passage. The fuel passage includes a fuel accumulation
chamber, an upstream fuel passage, a downstream fuel
passage, and a plurality of tangential feed holes. The
upstream fuel passage extends along an upstream fuel pas-
sage centerline to a terminal end of the upstream fuel
passage. The terminal end is spaced from the accumulation
chamber. The downstream fuel passage extends from a
passage inlet along a downstream fuel passage centerline.
The passage inlet is disposed at the accumulation chamber.
The plurality of tangential feed holes are formed by the first
fuel nozzle body. Each tangential feed hole of the plurality
of tangential feed holes extends between and to a hole inlet
and a hole outlet. The hole inlet is disposed at the upstream
fuel passage upstream of the terminal end. The hole outlet is
disposed at the accumulation chamber.

18 Claims, 5 Drawing Sheets

(56)                    References Cited

U.S. PATENT DOCUMENTS

| | | |
|---|---|---|
| 12,092,331 B2 | 9/2024 | Niemeyer |
| 2019/0093562 A1* | 3/2019 | Lau ........................ F23R 3/286 |
| 2019/0376690 A1 | 12/2019 | Niemeyer |
| 2021/0108800 A1* | 4/2021 | Rogers ................... F23R 3/283 |
| 2023/0022306 A1 | 1/2023 | Morgan |
| 2025/0027450 A1* | 1/2025 | Kannan .................. F23R 3/283 |

FOREIGN PATENT DOCUMENTS

| | | |
|---|---|---|
| EP | 3196554 A1 | 7/2017 |
| WO | 2024112474 A1 | 5/2024 |

* cited by examiner

FUEL NOZZLE FOR AN AIRCRAFT ENGINE

TECHNICAL FIELD

This disclosure relates generally to fuel injection nozzle assemblies for engines and, more particularly, to fuel passage configurations for fuel nozzles.

BACKGROUND OF THE ART

Combustion equipment for aircraft engines, such as gas turbine engines, may generally include one or more fuel nozzles for injecting a fuel into a combustion chamber. Various types and configurations of fuel nozzles are known in the art. While these known fuel nozzles have various advantages, there is still room in the art for improvement. There is a need in the art, therefore, for an improved fuel nozzle.

SUMMARY

It should be understood that any or all of the features or embodiments described herein can be used or combined in any combination with each and every other feature or embodiment described herein unless expressly noted otherwise.

According to an aspect of the present disclosure, a fuel nozzle for a gas turbine engine includes a first fuel nozzle body and a second fuel nozzle body mounted to the first fuel nozzle body. The first fuel nozzle body and the second fuel nozzle body form a fuel passage. The fuel passage includes a fuel accumulation chamber, an upstream fuel passage, a downstream fuel passage, and a plurality of tangential feed holes. The accumulation chamber is formed by the first fuel nozzle body and the second fuel nozzle body. The upstream fuel passage is formed by the first fuel nozzle body. The upstream fuel passage extends along an upstream fuel passage centerline to a terminal end of the upstream fuel passage. The terminal end is spaced from the accumulation chamber. The downstream fuel passage is formed by the second fuel nozzle body. The downstream fuel passage extends from a passage inlet along a downstream fuel passage centerline. The passage inlet is disposed at the accumulation chamber. The plurality of tangential feed holes are formed by the first fuel nozzle body. Each tangential feed hole of the plurality of tangential feed holes extends between and to a hole inlet and a hole outlet. The hole inlet is disposed at the upstream fuel passage upstream of the terminal end. The hole outlet is disposed at the accumulation chamber.

In any of the aspects or embodiments described above and herein, the fuel nozzle may further include a blockage disposed in the first fuel nozzle body. The blockage may form the terminal end and a portion of the accumulation chamber.

In any of the aspects or embodiments described above and herein, the upstream fuel passage centerline may be skewed relative to the downstream fuel passage centerline.

In any of the aspects or embodiments described above and herein, the hole outlet may be radially outward of the hole inlet for each tangential feed hole of the plurality of tangential feed holes relative to the upstream fuel passage centerline.

In any of the aspects or embodiments described above and herein, the passage inlet may be radially offset from the upstream fuel passage relative to the upstream fuel passage centerline.

In any of the aspects or embodiments described above and herein, the first fuel nozzle body may form a distal axial end. The second fuel nozzle body may form a proximal axial end. The distal axial end and the proximal axial end may have a centerline axis. The distal axial end and the proximal axial end may form the fuel accumulation chamber at the centerline axis.

In any of the aspects or embodiments described above and herein, wherein the distal axial end includes an end surface and a canted surface, the end surface is oriented perpendicular to the centerline axis, the canted surface extends circumferentially about the centerline axis and surrounds the end surface, and the canted surface faces away from the centerline axis.

In any of the aspects or embodiments described above and herein, wherein the hole outlet for each tangential feed hole of the plurality of tangential feed holes is disposed at the canted surface.

In any of the aspects or embodiments described above and herein, the centerline axis may extend through the upstream fuel passage.

In any of the aspects or embodiments described above and herein, the downstream fuel passage may be radially offset from centerline axis.

In any of the aspects or embodiments described above and herein, the second fuel nozzle body may form a cavity and the first fuel nozzle body may be disposed within the cavity.

In any of the aspects or embodiments described above and herein, the plurality of tangential feed holes may include a first tangential feed hole and a second tangential feed hole. The first tangential feed hole may have a first diameter. The second tangential feed hole may have a second diameter. The first diameter may be different than the second diameter.

In any of the aspects or embodiments described above and herein, the plurality of tangential feed holes may include a first tangential feed hole and a second tangential feed hole. The hole inlet of the first tangential feed hole may have a first axial location relative to the upstream fuel passage centerline. The hole inlet of the second tangential feed hole may have a second axial location relative to the upstream fuel passage centerline. The first axial location may be different than the second axial location.

In any of the aspects or embodiments described above and herein, the plurality of tangential feed holes may include a first tangential feed hole and a second tangential feed hole. The first tangential feed hole may be oriented at a first angle relative to the upstream fuel passage centerline. The second tangential feed hole may be oriented at a second angle relative to the upstream fuel passage centerline. The first angle may be different than the second angle.

In any of the aspects or embodiments described above and herein, the first fuel nozzle body may form the terminal end of the upstream fuel passage and the upstream fuel passage may be connected to the fuel accumulation chamber only by the plurality of tangential feed holes.

According to another aspect of the present disclosure, a fuel nozzle for a gas turbine engine includes a first fuel nozzle body and a second fuel nozzle body disposed along an axis. The first fuel nozzle body includes a distal axial end. The second fuel nozzle body includes a proximal axial end axially adjacent the distal axial end. The first fuel nozzle body and the second fuel nozzle body form a fuel passage. The fuel passage includes a fuel accumulation chamber, an upstream fuel passage, a downstream fuel passage, and a plurality of tangential feed holes. The accumulation chamber is formed by and axially between the distal axial end and the proximal axial end. The upstream fuel passage is formed by the first fuel nozzle body. The downstream fuel passage is formed by the second fuel nozzle body. The downstream fuel passage extends from a passage inlet along a downstream fuel passage centerline. The passage inlet is disposed at the proximal axial end. The plurality of tangential feed holes are formed by the first fuel nozzle body. Each tangential feed hole of the plurality of tangential feed holes extends between and connects the upstream fuel passage to the accumulation chamber at the distal axial end.

In any of the aspects or embodiments described above and herein, wherein the distal axial end includes an end surface and a canted surface, the end surface is oriented perpendicular to the axis, the canted surface extends circumferentially about the axis and surrounds the end surface, and the canted surface faces away from the axis.

In any of the aspects or embodiments described above and herein, wherein the proximal axial end includes an end surface and a canted surface, the end surface is oriented perpendicular to the axis, the canted surface extends circumferentially about the axis and surrounds the end surface, and the canted surface faces the axis.

According to another aspect of the present disclosure, a fuel nozzle for a gas turbine engine includes a first fuel nozzle body and a second fuel nozzle body mounted to the first fuel nozzle body. The first fuel nozzle body and the second fuel nozzle body form a fuel passage. The fuel passage includes a fuel accumulation chamber, an upstream fuel passage, a downstream fuel passage, and a plurality of tangential feed holes. The upstream fuel passage is formed by the first fuel nozzle body. The upstream fuel passage extends along an upstream fuel passage centerline. The downstream fuel passage is formed by the second fuel nozzle body. The downstream fuel passage extends from a passage inlet along a downstream fuel passage centerline. The downstream fuel passage centerline is skewed relative to the upstream fuel passage centerline. The passage inlet is radially offset from the upstream fuel passage relative to the upstream fuel passage centerline. The passage inlet is disposed at the accumulation chamber. The plurality of tangential feed holes are formed by the first fuel nozzle body. Each tangential feed hole of the plurality of tangential feed holes extends between and to a hole inlet and a hole outlet. The hole inlet is disposed at the upstream fuel passage. The hole outlet is disposed at the accumulation chamber.

In any of the aspects or embodiments described above and herein, the upstream fuel passage may be connected to the fuel accumulation chamber only by the plurality of tangential feed holes.

The present disclosure, and all its aspects, embodiments and advantages associated therewith will become more readily apparent in view of the detailed description provided below, including the accompanying drawings.

DETAILED DESCRIPTION

Figure 1:
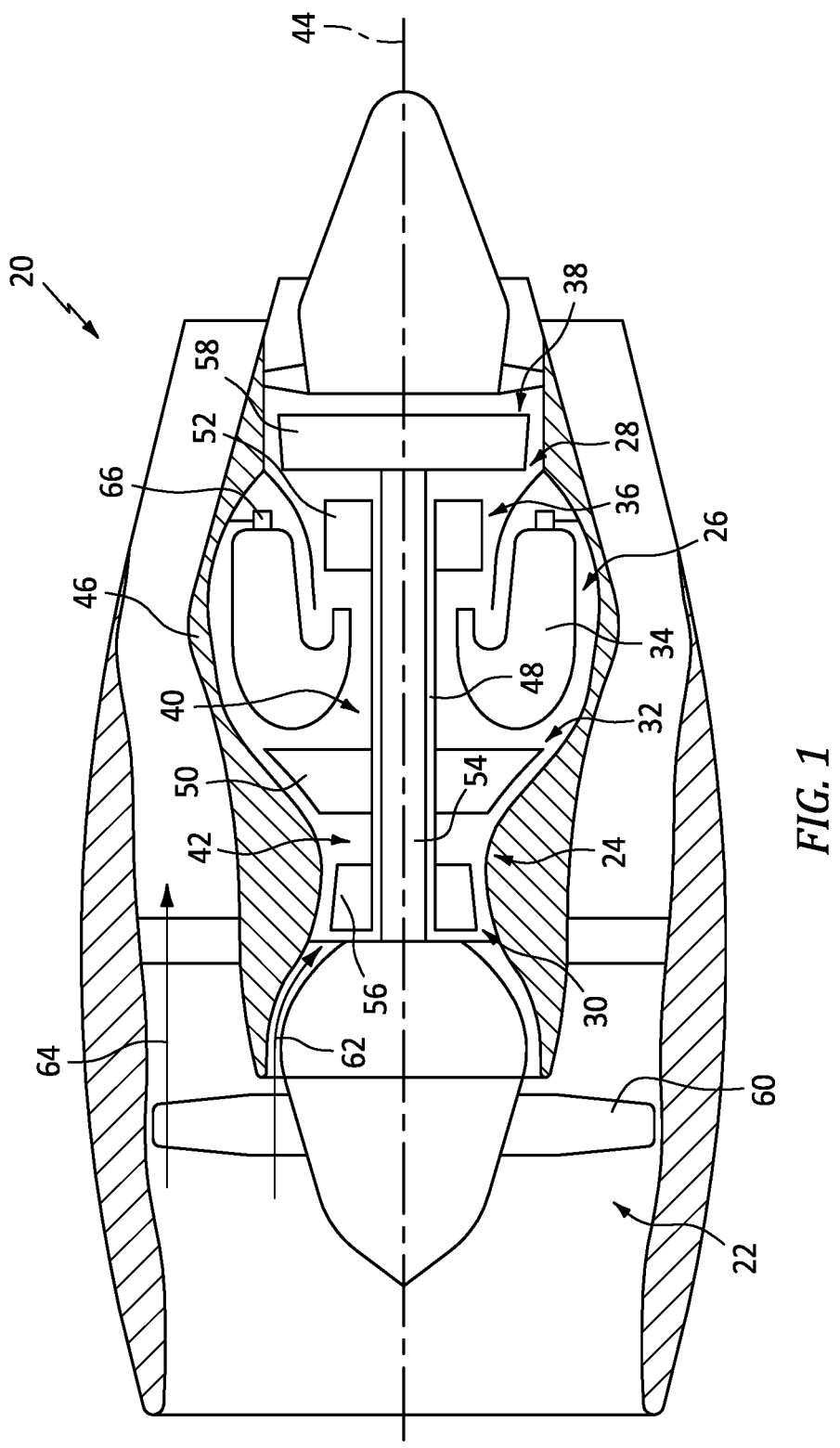
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for a propulsion system for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). While the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 20 of FIG. 1 includes a fan section 22, a compressor section 24, a combustor section 26, and a turbine section 28. For example, the compressor section 24 of FIG. 1 includes a low-pressure compressor (LPC) 30 and a high-pressure compressor (HPC) 32, the combustor section 16 includes a combustor 34 (e.g., an annular combustor), and the turbine section 28 includes a high-pressure turbine (HPT) 36 and a low-pressure turbine (LPT) 38.

The gas turbine engine 20 sections 22, 24, 28 form a first rotational assembly 40 (e.g., a high-pressure spool) and a second rotational assembly 42 (e.g., a low-pressure spool) of the gas turbine engine 20. The first rotational assembly 40 and the second rotational assembly 42 are mounted for rotation about a rotational axis 44 (e.g., an axial centerline of the gas turbine engine 20) relative to the engine static structure 46 of the gas turbine engine 20. The engine static structure 46 may include one or more engine cases, cowlings, bearing assemblies, and/or other non-rotating structures configured to house and/or support components of the gas turbine engine 20 sections 22, 24, 26, 28.

The first rotational assembly 40 includes a first shaft 48, a bladed first compressor rotor 50 for the high-pressure compressor 32, and a bladed first turbine rotor 52 for the high-pressure turbine 36. The first shaft 48 interconnects the bladed first compressor rotor 50 and the bladed first turbine rotor 52.

The second rotational assembly 42 includes a second shaft 54, a bladed second compressor rotor 56 for the low-pressure compressor 30, and a bladed second turbine rotor 58 for the low-pressure turbine 38. The second shaft 54 interconnects the bladed second compressor rotor 56 and the bladed second turbine rotor 58. The second shaft 54 of FIG. 1 additionally interconnects the bladed second compressor rotor 56 and the bladed second turbine rotor 58 with a bladed fan rotor 60 for the fan section 22. The second shaft 54 may alternatively be coupled to the bladed fan rotor 60 (e.g., an input shaft of the bladed fan rotor 60) by a reduction gear assembly configured to drive the bladed fan rotor 60 at a reduced rotational speed relative to the second shaft 54.

In operation of the gas turbine engine 20 of FIG. 1, ambient air is directed through the fan section 22 and into a core flow path 62 and a bypass flow path 64 by rotation of the bladed fan rotor 60. Airflow along the core flow path 62 is compressed by the low-pressure compressor 30 and the high-pressure compressor 32 and directed into the combustor 34. Fuel is injected into the combustor 34 by a fuel injection nozzle assembly 66. The compressed air along the core flow path is mixed and burned with the fuel in the combustor 34, and then directed through the high-pressure turbine 36 and the low-pressure turbine 38. The bladed first turbine rotor 52 and the bladed second turbine rotor 58 rotationally drive the first rotational assembly 40 and the second rotational assembly 42, respectively, in response to the combustion gas flow through the high-pressure turbine 36 and the low-pressure turbine 38. The first shaft 48 and the second shaft 54 are concentric and rotate about the rotational axis 44. The present disclosure, however, is not limited to concentric configurations of the first shaft 48 and the second shaft 54 and the first shaft 48 and the second shaft 55 may alternatively be configured for rotation about discrete rotational axes.

Figure 2:
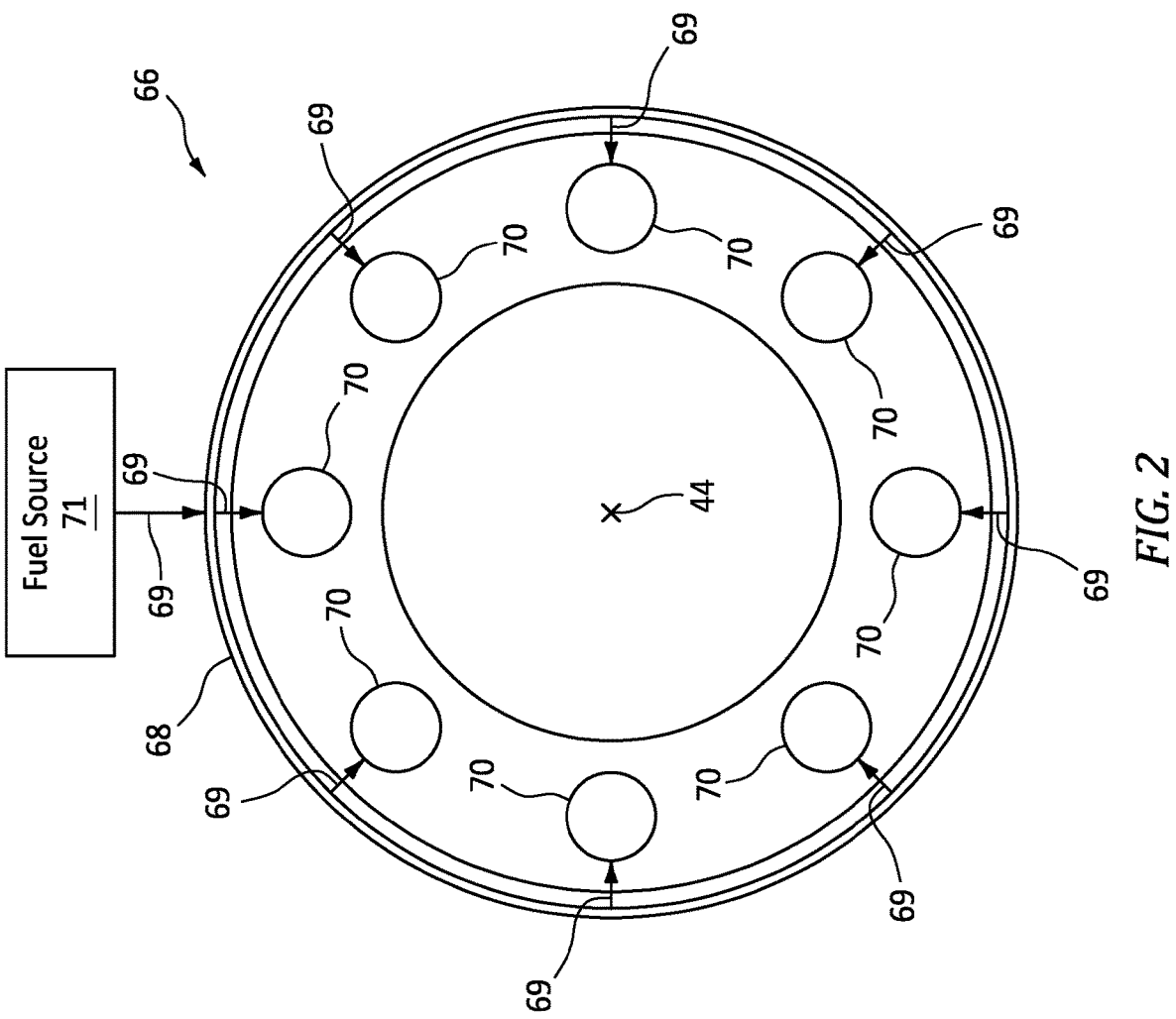
FIG. 2 illustrates a perspective view of a fuel injection nozzle assembly, in accordance with one or more embodiments of the present disclosure.

FIG. 2 illustrates an exemplary configuration of the fuel injection nozzle assembly 66 for a combustor, such as the combustor 34 of FIG. 1. The fuel injection nozzle assembly 66 includes an annular fuel manifold ring 68 and a plurality of fuel nozzles 70. The fuel manifold ring 68 is disposed at the combustor 34. The fuel nozzles 70 are circumferentially distributed about the fuel manifold ring 68. The fuel nozzles 70 are configured to direct from the fuel manifold ring 68 fuel into the combustor 34 for combustion during operation of the gas turbine engine 20 (see FIG. 1).

Figure 3:
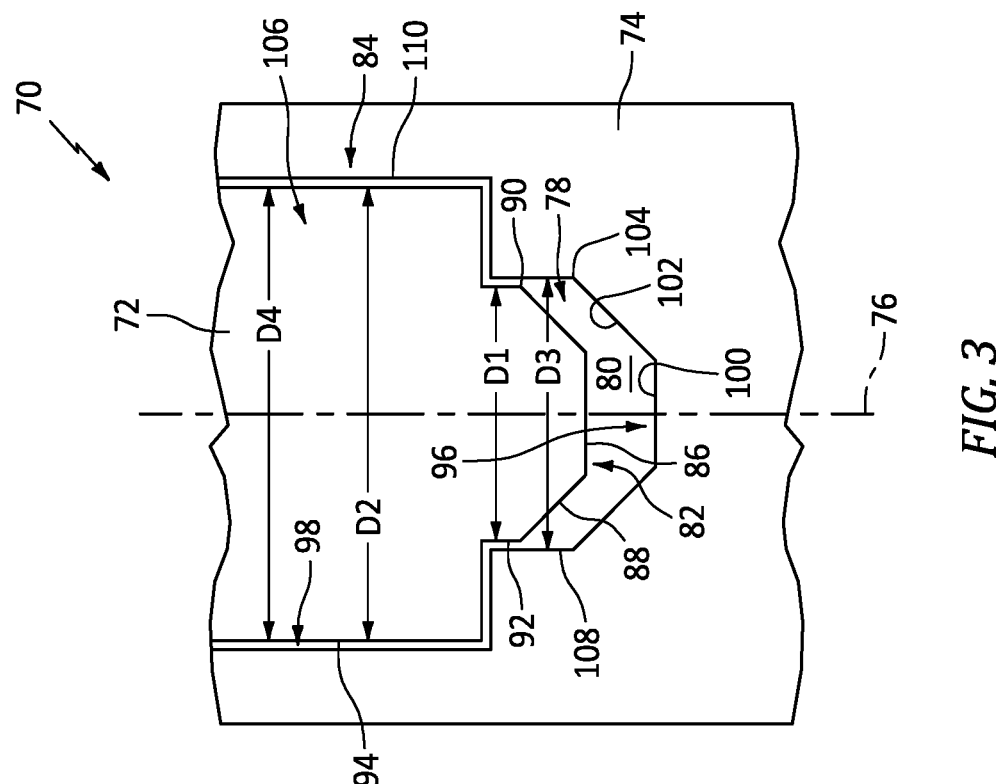
FIG. 3 illustrates a cutaway view of a portion of a fuel nozzle, in accordance with one or more embodiments of the present disclosure.

FIG. 3 illustrates a cutaway view of the fuel nozzle 70. The fuel nozzle 70 of FIG. 3 includes a first fuel nozzle body 72 and a second fuel nozzle body 74 disposed along an axis 76 (e.g., a centerline axis of the first fuel nozzle body 72 and/or the second fuel nozzle body 74). The first fuel nozzle body 72 and the second fuel nozzle body 74 form a fuel passage 78 of the fuel nozzle 70. The fuel passage 78 includes a fuel accumulation chamber 80 (sometimes referred to as a "fuel gallery") disposed axially between the first fuel nozzle body 72 and the second fuel nozzle body 74 at (e.g., on, adjacent, or proximate) the axis 76. While the first fuel nozzle body 72 and the second fuel nozzle body 74 are described herein as two discrete bodies (e.g., components) of the fuel nozzle 70, features of the first fuel nozzle body 72 and the second fuel nozzle body 74 may alternatively be formed as a single, monolithic component, for example, using additive manufacturing, metal injection molding (MIM), or the like.

The first fuel nozzle body 72 includes a distal axial end 82 and an inner perimeter sidewall 84. The distal axial end 82 forms a portion of the fuel accumulation chamber 80. The distal axial end 82 may be centered about the axis 76. The distal axial end 82 forms an end surface 86 at the axis 76. The end surface 86 faces the second fuel nozzle body 74. The end surface 86 forms a portion of the fuel accumulation chamber 80. The end surface 86 may be oriented perpendicular to or substantially perpendicular to the axis 76, however, the present disclosure is not limited to any particular angular orientation of the end surface 86 relative to the axis 76. The end surface 86 may extend to the inner perimeter sidewall 84. Alternatively, the distal axial end 82 may additionally form a canted surface 88 facing away from the axis 76. The canted surface 88 may be disposed coincident with the end surface 86. The canted surface 88 may extend about (e.g., completely around) the axis 76 and the end surface 86. The canted surface 88 may form a portion of the fuel accumulation chamber 80. The canted surface 88 may have a shape and/or orientation which is different than the end surface 86. The canted surface 88 of FIG. 3, for example, is a chamfered surface extending between the end surface 86 and the inner perimeter sidewall 84. The canted surface 88 may alternatively have a convex shape, a concave shape, or any other suitable shape for forming the accumulation chamber 80. The canted surface 88 may be symmetric about the axis 76. Alternatively, a circumferential portion of the canted surface 88 may have a shape and/or orientation which is different than another circumferential portion of the canted surface 88 (e.g., the canted surface 88 may be asymmetric relative to the axis 76). The inner perimeter sidewall 84 extends axially from a sidewall end 90 of the inner perimeter sidewall 84 disposed at (e.g., on, adjacent, or proximate) the distal axial end 82. For example, the sidewall end 90 of FIG. 3 is disposed at (e.g., on, adjacent, or proximate) the canted surface 88. The inner perimeter sidewall 84 extends about (e.g., completely around) the axis 76. For example, the inner perimeter sidewall 84 may extend circumferentially about the axis 76. The inner perimeter sidewall 84 may include a first axial sidewall portion 92 and a second axial sidewall portion 94. The first axial sidewall portion 92 may be disposed at (e.g., on, adjacent, or proximate) the sidewall end 90 and the distal axial end 82. The second axial sidewall portion 94 may extend axially from the first sidewall portion 92. The second axial sidewall portion 94 may have a diameter D2 which is greater than a diameter D1 of the first axial sidewall portion 92.

The second fuel nozzle body 74 includes a proximal axial end 96 and an outer perimeter sidewall 98. The proximal axial end 96 forms a portion of the fuel accumulation chamber 80. The proximal axial end 96 may be centered about the axis 76. The proximal axial end 96 forms an end surface 100 at the axis 76. The end surface 100 faces the first fuel nozzle body 72. The end surface 100 forms a portion of the fuel accumulation chamber 80. The end surface 100 may be oriented perpendicular to or substantially perpendicular to the axis 76, however, the present disclosure is not limited to any particular angular orientation of the end surface 100 relative to the axis 76. The end surface 100 may extend to the outer perimeter sidewall 98. Alternatively, the proximal axial end 96 may additionally form a canted surface 102 (e.g., an inverted canted surface) facing toward the axis 76. The canted surface 102 may be disposed coincident with the end surface 100. The canted surface 102 may extend about (e.g., completely around) the axis 76 and the end surface 100. The canted surface 102 may form a portion of the fuel accumulation chamber 80. The canted surface 102 may have a shape and/or orientation which is different than the end surface 100. The canted surface 102 of FIG. 3, for example, is a chamfered surface extending between the end surface 100 and the outer perimeter sidewall 98. The canted surface 102 may alternatively have a convex shape, a concave shape, or any other suitable shape for forming the accumulation chamber 80. The canted surface 102 may be symmetric about the axis 76. Alternatively, a circumferential portion of the canted surface 102 may have a shape and/or orientation which is different than another circumferential portion of the canted surface 102 (e.g., the canted surface 88 may be asymmetric relative to the axis 76). The outer perimeter sidewall 98 extends axially from a sidewall end 104 of the outer perimeter sidewall 98 disposed at (e.g., on, adjacent, or proximate) the proximal axial end 96. For example, the sidewall end 104 of FIG. 3 is disposed at (e.g., on, adjacent, or proximate) the canted surface 102. The outer perimeter sidewall 98 extends about (e.g., completely around) the axis 76. For example, the outer perimeter sidewall 98 may extend circumferentially about the axis 76. The outer perimeter sidewall 98 surrounds and forms a cavity 106 and the first fuel nozzle body 72 is disposed, at least in part, within the cavity 106. The outer perimeter sidewall 98 may include a first axial sidewall portion 108 and a second axial sidewall portion 110. The first axial sidewall portion 108 may be disposed at (e.g., on, adjacent, or proximate) the sidewall end 104 and the proximal axial end 96. The first axial sidewall portion 108 may form a portion of the fuel accumulation chamber 80. The first axial sidewall portion 108 may be mounted to or otherwise disposed at (e.g., on, adjacent, or proximate) the first axial sidewall portion 92. The second axial sidewall portion 110 may extend axially from the first sidewall portion 108. The second axial sidewall portion 110 may be mounted to or otherwise disposed at (e.g., on, adjacent, or proximate) the second axial sidewall portion 94. The second axial sidewall portion 110 may have a diameter D4 which is greater than a diameter D3 of the first axial sidewall portion 108.

Figure 4:
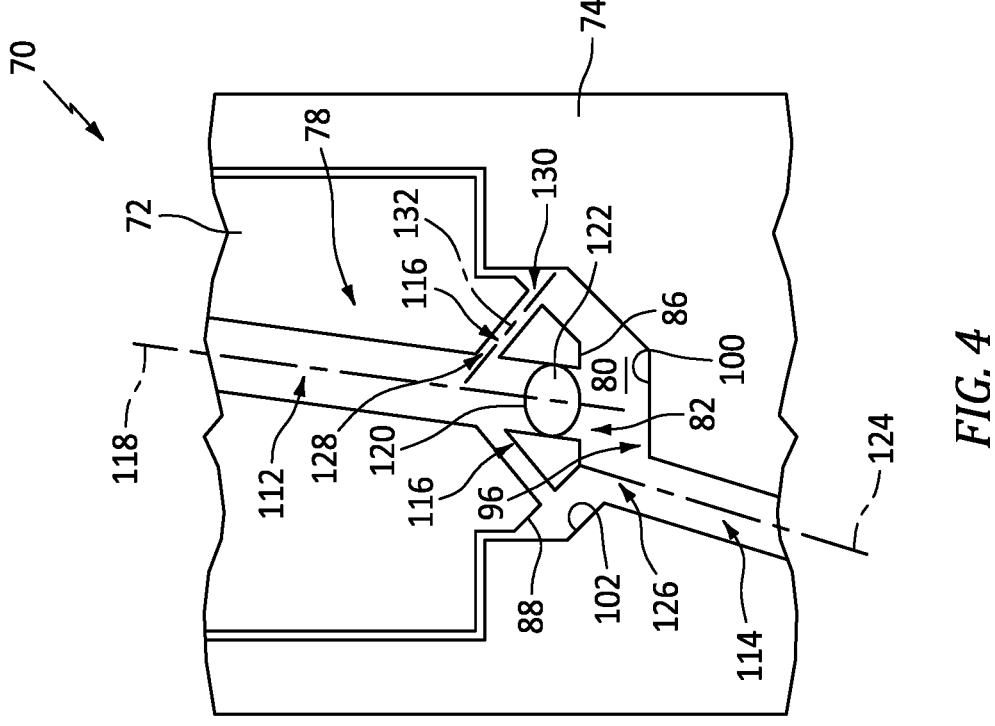
FIG. 4 illustrates another cutaway view of a portion of the fuel nozzle of FIG. 3, in accordance with one or more embodiments of the present disclosure.
Figure 5:
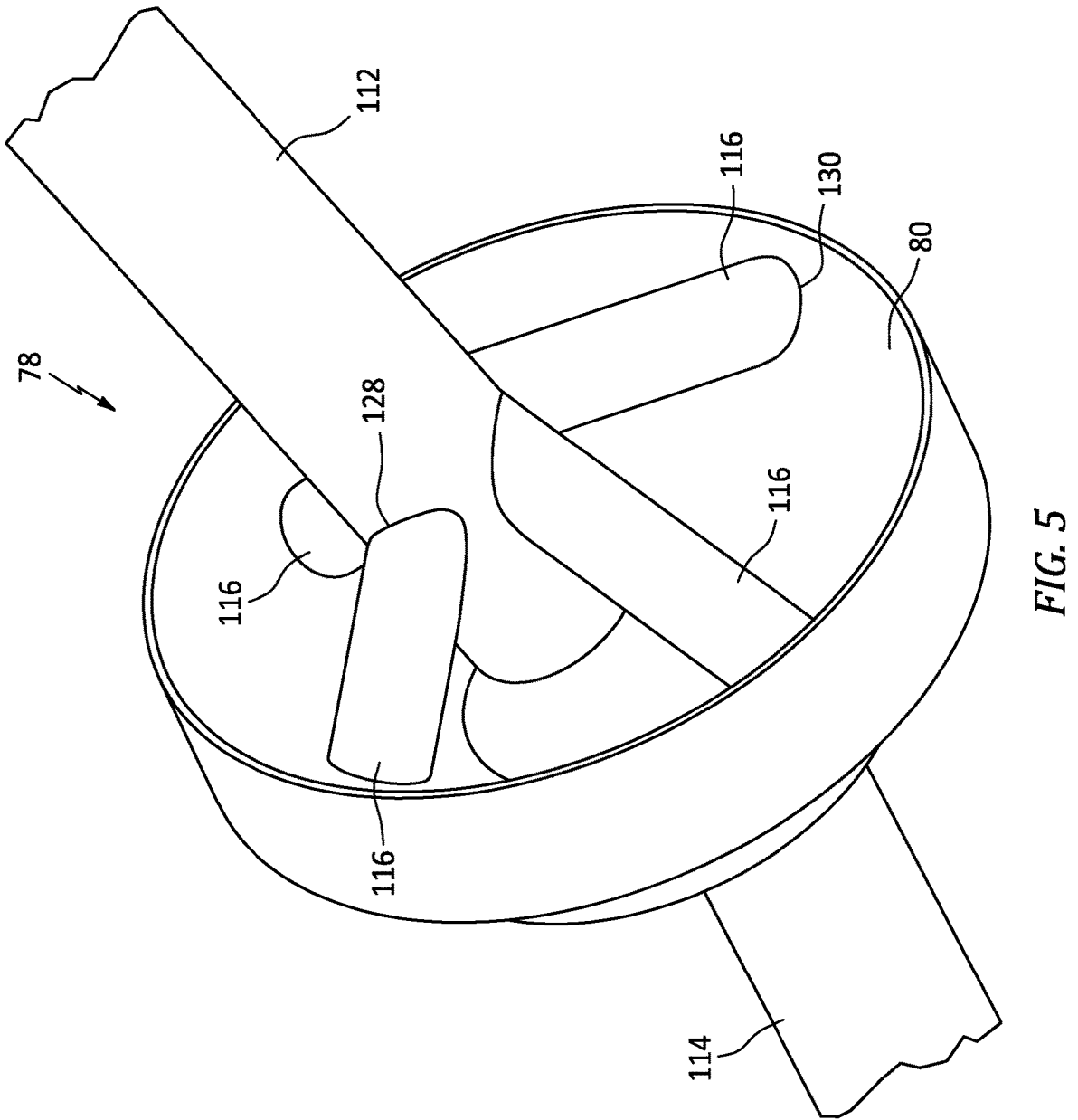
FIG. 5 illustrates a positive depiction of a fuel passage formed by the fuel nozzle of FIG. 3, in accordance with one or more embodiments of the present disclosure.

Referring to FIGS. 4 and 5, the fuel passage 78 is further illustrated. FIG. 4 illustrates another cutaway view of the fuel nozzle 70 illustrating additional portions of the fuel passage 78 formed by the first fuel nozzle body 72 and the second fuel nozzle body 74. FIG. 5 illustrates a perspective view of the fuel passage 78 with the solid features of FIG. 5 representing the fuel passage 78 (i.e., the fuel passage 78 is depicted positively in FIG. 5). The fuel passage 78 includes an upstream fuel passage 112, a downstream fuel passage 114, at least one tangential feed hole 116, and the fuel accumulation chamber 80.

The first fuel nozzle body 72 surrounds and forms the upstream fuel passage 112 along an upstream fuel passage centerline 118. The upstream fuel passage 112 extends along the upstream fuel passage centerline 118 to a terminal end 120 at (e.g., on, adjacent, or proximate) the distal axial end 82 (e.g., the end surface 86). For example, the upstream fuel passage 112 may extend from a fuel conduit of the fuel manifold ring 68 or another fuel source to the terminal end 120. As shown in FIG. 4, for example, the terminal end 120 may be spaced (e.g., axially spaced) from the fuel accumulation chamber 80. The upstream fuel passage centerline 118 may extend axially through the end surface 86, for example, at (e.g., on, adjacent, or proximate) the axis 76. The upstream fuel passage 112 may be disposed along the axis 76 (e.g., the upstream fuel passage centerline 118 and the axis 76 may be colinear). The upstream fuel passage centerline 118 may be parallel to the axis 76 but radially offset from the axis 76. The upstream fuel passage centerline 118 may be oriented at an angle relative to the axis 76 (see FIG. 3). For example, the upstream fuel passage centerline 118 may not be parallel to the axis 76. The axis 76 and the upstream fuel passage centerline 118 may be skew lines relative to one another.

The first fuel nozzle body 72 includes a blockage 122 forming the terminal end 120. The blockage 122 may additional form a portion of the fuel accumulation chamber 80. The blockage 122 may be disposed in the upstream fuel passage 112 at (e.g., on, adjacent, or proximate) the distal axial end 82 to seal the upstream fuel passage 112 from the fuel accumulation chamber 80. For example, the blockage 122 may prevent all or a substantial portion of fuel from flowing directly from the upstream fuel passage 112 to the fuel accumulation chamber 80. The blockage 122 may be formed by a rigid material body (e.g., a metal body), a mechanical fitting (e.g., a plug), a bonding material (e.g., a paste or other cured sealing material), or the like which is mounted to (e.g., welded, brazed, etc.), bonded to, or otherwise securely disposed on the first fuel nozzle body 72 within the upstream fuel passage 112 to form the terminal end 120. The use of the blockage 122 to form the terminal end 120 may facilitate manufacturing of the first fuel nozzle body 72 by allowing the upstream fuel passage 112 to be drilled or otherwise formed from the distal axial end 82 and subsequently obstructed using the blockage 122. The use of the blockage 122 may additionally facilitate modification of existing fuel nozzles to include the features of the fuel passage 78. As will be discussed in further detail, however, the present disclosure is not limited to the foregoing exemplary configuration of the first fuel nozzle body 72 including the blockage 122.

The second fuel nozzle body 74 surrounds and forms the downstream fuel passage 114 along a downstream fuel passage centerline 124. The downstream fuel passage 114 extends along the downstream fuel passage centerline 124 from a passage inlet 126 at (e.g., on, adjacent, or proximate) the fuel accumulation chamber 80 to an outlet or other downstream fuel flow component of the fuel nozzle 70 (see, e.g., FIG. 2). The passage inlet 126 is formed by the proximal axial end 96. For example, the passage inlet 126 may be formed by one or both of the end surface 100 and the canted surface 102. The passage inlet 126 may be radially offset from the upstream fuel passage 112 and/or the upstream fuel passage centerline 118 relative to the axis 76 (see FIG. 3) and/or the upstream fuel passage centerline 118. The downstream fuel passage 114 may be disposed along the axis 76 (e.g., the downstream fuel passage centerline 124 and the axis 76 may be colinear). The downstream fuel passage centerline 124 may be parallel to the axis 76 but radially offset from the axis 76. The downstream fuel passage centerline 124 may be oriented at an angle relative to the axis 76 (see FIG. 3). For example, the downstream fuel passage centerline 124 may not be parallel to the axis 76. The axis 76 and the downstream fuel passage centerline 124 may be skew lines relative to one another. The downstream fuel passage centerline 124 may also be oriented at an angle relative to the upstream fuel passage centerline 118. For example, the downstream fuel passage centerline 124 may not be parallel to the upstream fuel passage centerline 118. The upstream fuel passage centerline 118 and the downstream fuel passage centerline 124 may be skew lines relative to one another. The downstream fuel passage centerline 124 may alternatively be oriented parallel to and radially offset from the upstream fuel passage centerline 118.

The first fuel nozzle body 72 surrounds and forms each of the tangential feed holes 116. Each tangential feed hole 116 extends between and to a feed hole inlet 128 of the tangential feed hole 116 and a feed hole outlet 130 of the tangential feed hole 116 along a feed hole centerline 132. The feed hole inlet 128 is disposed at (e.g., on, adjacent, or proximate) the upstream fuel passage 112. The feed hole inlet 128 is disposed upstream of the terminal end 120 with respect to a fuel flow through the upstream fuel passage 112. The feed hole outlet 130 is disposed at (e.g., on, adjacent, or proximate) the fuel accumulation chamber 80. The feed hole outlet 130 is formed by the distal axial end 82. For example, the feed hole outlet 130 may be formed by the canted surface 88. The feed hole outlet 130 of each tangential feed hole 116 is disposed radially outward of the upstream fuel passage 112. The feed hole centerline 132 for each tangential feed hole 116 extends radially outward from the upstream fuel passage 112, in a direction from the feed hole inlet 128 to the feed hole outlet 130 and relative to the upstream fuel passage centerline 118. Each of the tangential feed holes 116 is configured to direct fuel from the upstream fuel passage 112 to the fuel accumulation chamber 80. For example, the tangential feed holes 116 may be configured to direct fuel toward radially outer regions of the fuel accumulation chamber 80 and/or to regions of the fuel accumulation chamber 80 which may otherwise experience fuel flow stagnation. The upstream fuel passage 112 may be connected to the fuel accumulation chamber 80 only by the tangential feed holes 116. Each tangential feed hole 116 may have a diameter which is smaller than a diameter of the upstream fuel passage 112, however, the present disclosure is not limited to this particular configuration of the tangential feed holes 116. The fuel passage 78 of FIG. 5 includes four tangential feed holes 116, however, the present disclosure is not limited to any particular number of the tangential feed holes 116 for the fuel passage 78. The present disclosure is also not limited to any particular shape, size, or orientation of the tangential feed holes 116.

We have found that in fuel nozzle configurations in which the upstream fuel passage is alternatively used to directly supply fuel to the fuel accumulation chamber, the angular orientations and/or radial offset configuration of the upstream fuel passage and the downstream fuel passage may facilitate fuel mixing and swirling within the fuel accumulation chamber. However, this alternative fuel nozzle configuration may also form fuel stagnation regions within the fuel accumulation chamber in which ineffective fuel circulation increases the risk of fuel coking within the fuel accumulation chamber, thereby negatively impacting fuel nozzle durability. In operation of the fuel nozzle 70, the tangential feed holes 116 direct fuel from the upstream fuel passage 112 to the fuel accumulation chamber 80. The tangential feed holes 116 facilitate improved circulation of the fuel within the fuel accumulation chamber 80, thereby reducing or eliminating fuel stagnation regions within the accumulation chamber 80 and improving fuel nozzle 70 durability. The fuel within the fuel accumulation chamber 80 subsequently flows into and through the downstream fuel passage 114 and is directed by the fuel nozzle 70 into the combustor 34 (see FIG. 1).

Figures 6A, 6B, 6C, 6D, 6E:
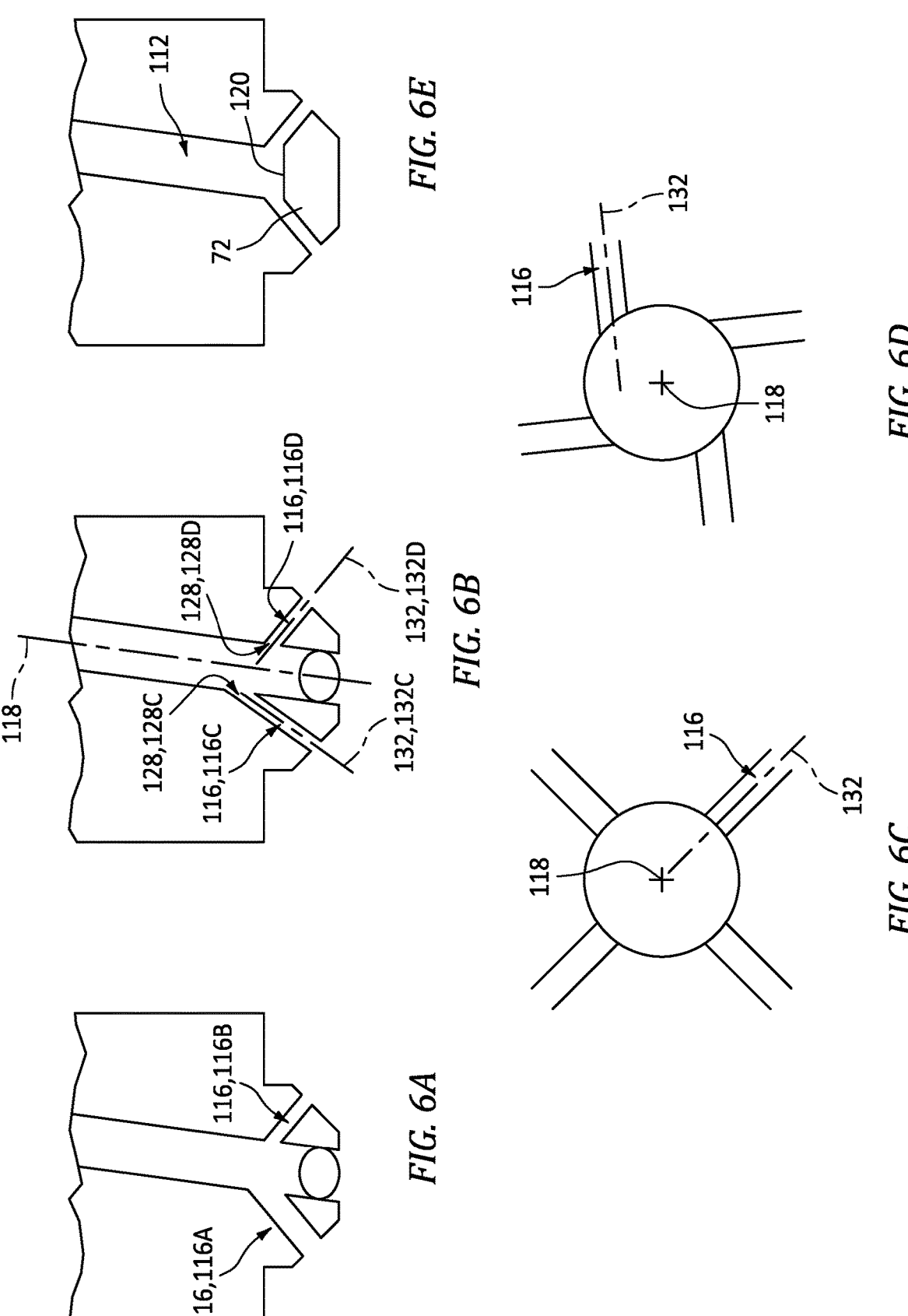
FIGS. 6A-E illustrate cutaway views of embodiments of fuel passages, in accordance with one or more embodiments of the present disclosure.

Referring to FIGS. 6A-D, various features of the tangential feed holes 116 may be tailored to control fuel flow and circulation within the fuel accumulation chamber 80 (see FIGS. 3-4). For example, a quantity of the tangential feed holes 116, a size (e.g., a diameter) of the tangential feed holes 116, a location (e.g., an axial location) of the feed hole inlet 128 of the tangential feed holes 116, and/or an orientation of the tangential feed holes 116 may be tailored to facilitate improved fuel circulation within the fuel accumulation chamber 80. As shown in FIG. 6A, for example, a first tangential feed hole 116A may have a first diameter which is greater than a second diameter of a second tangential feed hole 116B. As shown in FIG. 6B, for example, a first tangential feed hole 116C may have a first feed hole inlet 128C which is disposed at a first axial position along the upstream fuel passage 112 which is different than a second axial position of a second feed hole inlet 128D of a second tangential feed hole 116D relative to the upstream fuel passage centerline 118. The first tangential feed hole 116C has a first feed hole centerline 132C which is oriented, relative to the upstream fuel passage centerline 118, at a different angle than a second feed hole centerline 132D for the second tangential feed hole 116D. As shown in FIG. 6C, for example, the feed hole centerline 132 for one or more of the tangential feed holes 116 may extend through a position at (e.g., on, adjacent, or proximate) the upstream fuel passage centerline 118 (e.g., the feed hole centerline 132 may intersect the upstream fuel passage centerline 118). As shown in FIG. 6D, for example, the feed hole centerline 132 for one or more of the tangential feed holes 116 may be offset (e.g., skewed) from the upstream fuel passage centerline 118.

Referring to FIG. 6E, in some embodiments, the first fuel nozzle body 72 and the upstream fuel passage 112 may be formed without the blockage 122 (see FIG. 4). For example, the upstream fuel passage 112 may be drilled or otherwise formed through the first fuel nozzle body 72 toward the terminal end 120 such that the first fuel nozzle body 72 forms the terminal end 120.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts, and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A fuel nozzle for a gas turbine engine, the fuel nozzle comprising:

a first fuel nozzle body;

a second fuel nozzle body mounted to the first fuel nozzle body; and the first fuel nozzle body and the second fuel nozzle body form a fuel passage, the fuel passage includes an accumulation chamber, an upstream fuel passage, a downstream fuel passage, and a plurality of tangential feed holes;

the upstream fuel passage is formed by the first fuel nozzle body, the upstream fuel passage extends along an upstream fuel passage centerline;

the downstream fuel passage is formed by the second fuel nozzle body, the downstream fuel passage extends from a passage inlet along a downstream fuel passage centerline, the downstream fuel passage centerline is skewed relative to the upstream fuel passage centerline, the passage inlet is radially offset from the upstream fuel passage relative to the upstream fuel passage centerline, and the passage inlet is disposed at the accumulation chamber; and the plurality of tangential feed holes are formed by the first fuel nozzle body, each tangential feed hole of the plurality of tangential feed holes extends between and to a hole inlet and a hole outlet, the hole inlet is disposed at the upstream fuel passage, the hole outlet is disposed at the accumulation chamber;

wherein the plurality of tangential feed holes includes a first tangential feed hole and a second tangential feed hole, the first tangential feed hole is oriented at a first angle relative to the upstream fuel passage centerline, the second tangential feed hole is oriented at a second angle relative to the upstream fuel passage centerline, and the first angle is different than the second angle.

2. The fuel nozzle of claim 1, wherein the upstream fuel passage is connected to the accumulation chamber only by the plurality of tangential feed holes.

3. A fuel nozzle for a gas turbine engine, the fuel nozzle comprising:

a first fuel nozzle body and a second fuel nozzle body disposed along an axis, the first fuel nozzle body includes a distal axial end, and the second fuel nozzle body includes a proximal axial end axially adjacent the distal axial end, the first fuel nozzle body and the second fuel nozzle body form a fuel passage, the fuel passage includes an accumulation chamber, an upstream fuel passage, a downstream fuel passage, and a plurality of tangential feed holes;

the accumulation chamber is formed by and axially between the distal axial end and the proximal axial end;

the upstream fuel passage is formed by the first fuel nozzle body, the upstream fuel passage extends along an upstream fuel passage centerline;

the downstream fuel passage is formed by the second fuel nozzle body, the downstream fuel passage extends from a passage inlet along a downstream fuel passage centerline, and the passage inlet is disposed at the proximal axial end; and the plurality of tangential feed holes are formed by the first fuel nozzle body, each tangential feed hole of the plurality of tangential feed holes extends between and connects the upstream fuel passage to the accumulation chamber at the distal axial end;

wherein the plurality of tangential feed holes includes a first tangential feed hole and a second tangential feed hole, a first hole inlet of the first tangential feed hole has a first axial location relative to the upstream fuel passage centerline, a second hole inlet of the second tangential feed hole has a second axial location relative to the upstream fuel passage centerline, and the first axial location is different than the second axial location.

4. The fuel nozzle of claim 3, wherein the distal axial end includes an end surface and a canted surface, the end surface is oriented perpendicular to the axis, the canted surface extends circumferentially about the axis and surrounds the end surface, and the canted surface faces away from the axis.

5. The fuel nozzle of claim 3, wherein the proximal axial end includes an end surface and a canted surface, the end surface is oriented perpendicular to the axis, the canted surface extends circumferentially about the axis and surrounds the end surface, and the canted surface faces the axis.

6. A fuel nozzle for a gas turbine engine, the fuel nozzle comprising:

a first fuel nozzle body;

a second fuel nozzle body mounted to the first fuel nozzle body; and the first fuel nozzle body and the second fuel nozzle body form a fuel passage, the fuel passage includes an accumulation chamber, an upstream fuel passage, a downstream fuel passage, and a plurality of tangential feed holes;

the accumulation chamber is formed by the first fuel nozzle body and the second fuel nozzle body;

the upstream fuel passage is formed by the first fuel nozzle body, the upstream fuel passage extends along an upstream fuel passage centerline to a terminal end of the upstream fuel passage, and the terminal end is spaced from the accumulation chamber;

the downstream fuel passage is formed by the second fuel nozzle body, the downstream fuel passage extends from a passage inlet along a downstream fuel passage centerline, and the passage inlet is disposed at the accumulation chamber; and the plurality of tangential feed holes are formed by the first fuel nozzle body, each tangential feed hole of the plurality of tangential feed holes extends between and to a hole inlet and a hole outlet, the hole inlet is disposed at the upstream fuel passage upstream of the terminal end, the hole outlet is disposed at the accumulation chamber;

wherein the plurality of tangential feed holes includes a first tangential feed hole and a second tangential feed hole, the hole inlet of the first tangential feed hole has a first axial location relative to the upstream fuel passage centerline, the hole inlet of the second tangential feed hole has a second axial location relative to the upstream fuel passage centerline;

wherein the first tangential feed hole is oriented at a first angle relative to the upstream fuel passage centerline, the second tangential feed hole is oriented at a second angle relative to the upstream fuel passage centerline; and wherein the first axial location is different than the second axial location, or the first angle is different than the second angle.

7. The fuel nozzle of claim 6, further comprising a blockage disposed in the first fuel nozzle body, and the blockage forms the terminal end and a portion of the accumulation chamber.

8. The fuel nozzle of claim 6, wherein the upstream fuel passage centerline is skewed relative to the downstream fuel passage centerline.

9. The fuel nozzle of claim 6, wherein the hole outlet is radially outward of the hole inlet for each tangential feed hole of the plurality of tangential feed holes relative to the upstream fuel passage centerline.

10. The fuel nozzle of claim 6, wherein the passage inlet is radially offset from the upstream fuel passage relative to the upstream fuel passage centerline.

11. The fuel nozzle of claim 6, wherein the first fuel nozzle body forms a distal axial end, the second fuel nozzle body forms a proximal axial end, the distal axial end and the proximal axial end are centered about a centerline axis, and the distal axial end and the proximal axial end form the accumulation chamber at the centerline axis.

12. The fuel nozzle of claim 11, wherein the distal axial end includes an end surface and a canted surface, the end surface is oriented perpendicular to the centerline axis, the canted surface extends circumferentially about the centerline axis and surrounds the end surface, and the canted surface faces radially outward from the centerline axis.

13. The fuel nozzle of claim 12, wherein the hole outlet for each tangential feed hole of the plurality of tangential feed holes is disposed at the canted surface.

14. The fuel nozzle of claim 11, wherein the centerline axis extends through the upstream fuel passage.

15. The fuel nozzle of claim 11, wherein the downstream fuel passage is radially offset from centerline axis.

16. The fuel nozzle of claim 6, wherein the second fuel nozzle body forms a cavity and the first fuel nozzle body is disposed within the cavity.

17. The fuel nozzle of claim 6, wherein the plurality of tangential feed holes includes a first tangential feed hole and a second tangential feed hole, the first tangential feed hole has a first diameter, the second tangential feed hole has a second diameter, and the first diameter is different than the second diameter.

18. The fuel nozzle of claim 6, wherein the first fuel nozzle body forms the terminal end of the upstream fuel passage and the upstream fuel passage is connected to the accumulation chamber only by the plurality of tangential feed holes.

* * * * *